United States Patent
Zamir et al.

(10) Patent No.: US 12,039,061 B2
(45) Date of Patent: *Jul. 16, 2024

(54) ZERO-KNOWLEDGE PROTECTION FOR SIDE CHANNELS IN DATA PROTECTION TO THE CLOUD

(71) Applicant: EMC IP Holding Company LLC, Hopkinton, MA (US)

(72) Inventors: Amos Zamir, Beer Sheva (IL); Jehuda Shemer, Kfar Saba (IL); Kfir Wolfson, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,422

(22) Filed: Jun. 17, 2022

(65) Prior Publication Data

US 2022/0318409 A1 Oct. 6, 2022

Related U.S. Application Data

(63) Continuation of application No. 16/744,814, filed on Jan. 16, 2020, now Pat. No. 11,379,595.

(51) Int. Cl.
*G06F 21/60* (2013.01)
*G06F 3/06* (2006.01)
*H04L 9/40* (2022.01)

(52) U.S. Cl.
CPC .......... *G06F 21/606* (2013.01); *G06F 3/0613* (2013.01); *G06F 3/0617* (2013.01);
(Continued)

(58) Field of Classification Search
CPC .... G06F 21/606; G06F 21/556; G06F 3/0656; G06F 3/0659; G06F 3/067; G06F 3/0683; H04L 63/14
See application file for complete search history.

(56) References Cited

U.S. PATENT DOCUMENTS 6,651,113 B1  11/2003  Grimsrud
7,174,422 B1 *  2/2007  Kowalchik ........... G06F 3/0617
                                            714/6.22
(Continued)

FOREIGN PATENT DOCUMENTS

CN   111885009 A  * 11/2020  ............. G05B 15/02
DE   102015213263 A1 *  1/2017
(Continued)

OTHER PUBLICATIONS

International Preliminary Report on Patentability received for PCT Patent Application No. PCT/US2020/063584, mailed on Jul. 28, 2022, 7 pages.
(Continued)

*Primary Examiner* — Sarah Su
(74) *Attorney, Agent, or Firm* — Workman Nydegger

(57) ABSTRACT

Masking a data rate of transmitted data is disclosed. As data is transmitted from a production site to a secondary site, the data rate is masked. Masking the data rate can include transmitting at a fixed rate, a random rate, or an adaptive rate. Each mode of data transmission masks or obscures the actual data rate and thus prevents others from gaining information about the data or the data owner from the data transfer rate.

20 Claims, 5 Drawing Sheets

(52) U.S. Cl.
CPC .......... *G06F 3/0656* (2013.01); *G06F 3/0659* (2013.01); *G06F 3/067* (2013.01); *G06F 3/0683* (2013.01); *H04L 63/14* (2013.01)

(56) References Cited

U.S. PATENT DOCUMENTS

| | | |
|---|---|---|
| 7,337,248 B1 | 2/2008 | Rao et al. |
| 11,082,129 B1 | 8/2021 | Nayar et al. |
| 11,379,595 B2 * | 7/2022 | Zamir .................... G06F 3/0613 |
| 2003/0229755 A1 | 12/2003 | Espeseth et al. |
| 2006/0050660 A1 * | 3/2006 | Wells ................. H04B 7/18582 |
| | | 370/316 |
| 2007/0250752 A1 * | 10/2007 | Prosch .............. H03M 13/2707 |
| | | 714/752 |
| 2008/0198876 A1 | 8/2008 | Stanger et al. |
| 2013/0007380 A1 | 1/2013 | Seekins et al. |
| 2015/0036695 A1 | 2/2015 | Gowda et al. |
| 2016/0241514 A1 | 8/2016 | Seul et al. |
| 2018/0227317 A1 * | 8/2018 | Xu ........................... G06F 21/55 |
| 2019/0229894 A1 | 7/2019 | Samid |
| 2020/0264796 A1 | 8/2020 | Lyu et al. |
| 2021/0152578 A1 * | 5/2021 | Alanazi .................... H04L 63/20 |

FOREIGN PATENT DOCUMENTS

| | | | | |
|---|---|---|---|---|
| GB | 2605732 A | * | 10/2022 | ........... G06F 21/556 |
| WO | WO-2012075347 A1 | * | 6/2012 | ............. G06F 15/16 |
| WO | WO-2018085771 A1 | * | 5/2018 | ............. H04L 63/04 |

OTHER PUBLICATIONS

International Search Report and Written Opinion received for PCT Patent Application No. PCT/US2020/063584, mailed on Mar. 22, 2021, 11 pages.

* cited by examiner

ZERO-KNOWLEDGE PROTECTION FOR SIDE CHANNELS IN DATA PROTECTION TO THE CLOUD

FIELD OF THE INVENTION

Embodiments of the present invention generally relate to data protection. More particularly, embodiments of the invention relate to systems, hardware, software, computer-readable media, and methods for protecting data, including protecting metadata or protecting side channels.

BACKGROUND

Data protection generally refers to the process of ensuring that production data can be recovered if necessary. Generally, this is achieved by generating backups of the production data. As a result of the backup operation, a copy of the production data, which is often stored on primary storage, is generated and stored as a backup on secondary storage. In many instances, the secondary storage and the primary storage are both on-premise storage.

Today, however, many entities are moving their secondary storage from local infrastructure to the cloud (e.g., a datacenter). This should reduce cost and delegates maintenance of the backups and of the secondary storage to the cloud provider. This process does not come without risk. Moving data to the cloud of a cloud provider may compromise privacy. To protect privacy and confidentiality, the backups (or other data transmitted to the cloud) may be encrypted prior to transmission.

Even if the data is encrypted, the data is not completely protected at least because metadata (also referred to herein as side channels or side channel data) about the data may not be protected. Performance metrics such as storage size, input/output (IO) rates, and other metrics could potentially be accessed by third parties including malicious attackers. In fact, side channels may reveal information that the owner of the data would rather not reveal. The insights gained from side channels can be correlated with events or used to anticipate future events and could be used in a manner that is unintended or even malicious.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
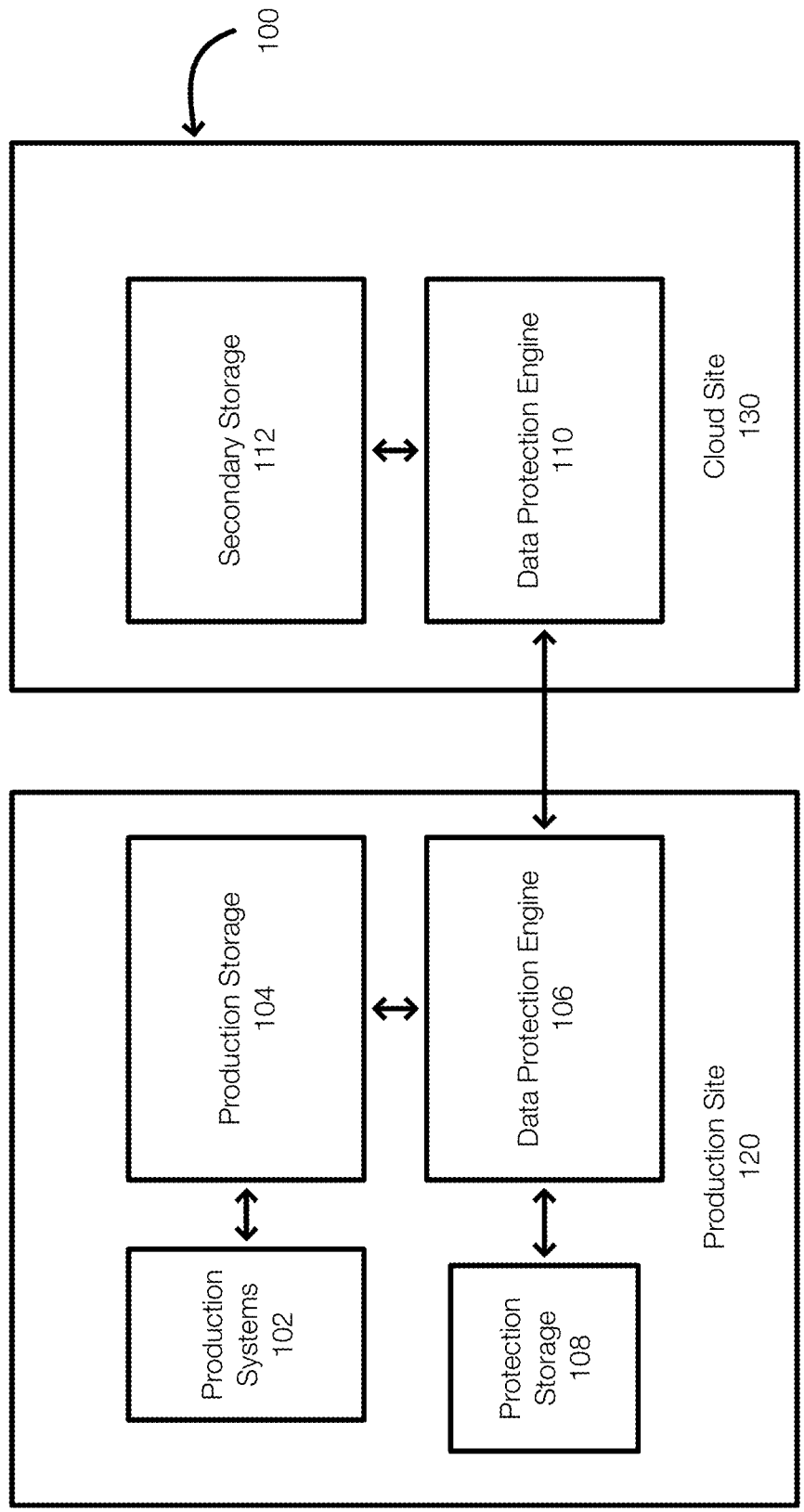
FIG. 1 illustrates an example of a data protection engine, operating in a computing system configured to mask a side channel.

Embodiments of the present invention generally relate to data protection. More particularly, at least some embodiments of the invention relate to systems, hardware, software, computer-readable media, and methods for performing data protection operations. Examples of data protection operations include, but are not limited to, side channel operations, metadata operations, backup operations, restore operations, replication operations, deduplication operations, encryption/decryption operations, compression/decompression operations, and the like or combination thereof.

Embodiments of the invention more specifically relate to metadata protection operations or side channel operations. These operations may include protecting or obscuring performance metrics or other metadata or side channels associated with or related to data such as data that has been uploaded to the cloud.

Cloud service providers (CSPs) such as AWS, Azure, and GCP provide several technologies and levels to store data. These may include, by way of example only, EBS (block level storage), EFS (file system storage), tiered object storage, and database storage. In addition to these different storage technologies, cloud-based storage can be used in multiple ways. Cloud based storage can be used for backups, recovery business continuity, disaster recovery, archiving, long term retention, or the like. Embodiments of the invention also relate to data protection operations for virtualized systems such as virtual machines, containerized applications, or the like.

As previously stated, the data moved to the cloud may be encrypted for various reasons. While storing data in a cloud infrastructure provides many benefits, cloud storage also opens new privacy concerns that may not be present in on-premise infrastructures.

For example, when entities use cloud storage systems such as a public cloud service or datacenter, these entities have less control over who has access to the data (even if encrypted) and/or the metadata or side channels, who operates the infrastructure, who has access to log files, where the data/metadata is kept, how the data is replicated or stored, performance metrics, and the like. An entity that requires substantial privacy should consider cloud providers, their employees, and/or their partners when performing risk assessment.

For example, encrypting the data before uploading the data may prevent others from reading the data, but encrypting the data does not prevent others from gaining knowledge about the data. Data uploaded to the cloud or transferred within the cloud, or downloaded from the cloud is associated with metadata or side channels related to the protected data. In some examples, the side channels are generated in response to transferring the data (e.g., from on-premise to cloud, intra-cloud, or intercloud). These side channels can potentially be used to expose or identify various activities or events, including abnormal or outside of normal activities or events. For example, some events or activities may be exposed or deduced by examining the associated performance metrics (an example of metadata or a side channel).

More generally, the side channels can be used retrospectively. For example, an analysis of a side channel may reveal a correlation or an association between the performance metrics and the announcement of a new product or other corporate news. As a result, detecting a similar change in the performance metrics may allow a third party to think that news is imminent. Thus, the side channels associated with the data can be correlated with external events. More specifically, news or other events or activities can be deduced prior to the actual announcement thereof based on the side channels. Information gained from the side channels can be used in multiple ways including online, in a retrospective analysis or in a deductive analysis. The side channels may allow a third party to take action prior to an event (e.g., make their own announcement, buy/sell stock, etc.). This can impact the owner of the data and/or other entities.

The consequences of obtaining side channel information should not be overlooked and can be treated like other cyber-attacks. For instance, understanding when a company is performing a large operation (e.g., an increase in data upload/download rate) can have great value for its competitors and leakage of this information could have a large impact on its stock market value. Knowing in advance when a military organization, based on side channel data, will be "on the move" can change preparations for wars, and so forth.

For at least these reasons and other, entities that want to achieve a high or a higher degree of privacy should also prevent others from learning patterns or behaviors related to protected data, which can be obtained, derived, or hinted at from side channels including performance metrics such as amount of traffic, IO rate, data transfer rate, cloud provider log files, and other statistics.

When storing data to the cloud, one of the side channels associated with the data is the data upload rate. Other side channels may include, but are not limited to, the total data residing in the cloud, the data access frequency, the data access patterns, storage types, data locations (e.g., folders, database tables), multi-cloud data, data entropy, data encryption type, the source (e.g., networks, devices, locations) of the data, or the like or combination thereof.

The data upload rate (and/or download rate) is an example of a side channel that can be protected in accordance with embodiments of the invention. Generally, the data upload rate is protected by masking (e.g., hiding, obscuring, or the like) the data rate. By masking the data rate, the ability of a third party to deduce upcoming events or correlate the data upload rate with past events or potential future events or to use the data rate for other reasons is impeded if not prevented.

Embodiments of the invention thus mask the data rate and/or other side channel information. This prevents the side channel data from being used in an unauthorized manner and provides further protection for the side channel itself and/or the associated data.

FIG. 1 illustrates an example of an environment in which data is protected and in which side channels are protected. The system 100 illustrates a protection site 120 and a secondary site such as a cloud site 130 or a datacenter. The system 100 includes or is associated with a data protection system or application that is illustrated as a data protection engine 106 and/or a data protection engine 110. The data protection engine 106 and/or the data protection engine 110 are configured to perform, manage, coordinate, direct (or the like) data protection operations such that data of the production site 120 is protected at the cloud site 130. The data protection operations may be performed (or otherwise managed or coordinated) by a data protection engine 106 and/or the data protection engine 110. The data protection engine 106 may coordinate with a data protection engine 110 operating at the cloud site 130.

While performing data protection operations, data may be transferred between the production site 120 and the cloud site 130 or, more specifically, from the production storage 104 to the secondary storage 112. The data transferred can take various forms and formats that may depend on the storage provided at the cloud site 130, the manner in which the data is stored at the production site 120, or the like. For example, the transferred data may include changes in the production data, snapshots, other backups, encapsulated data, or the like. The data may be streamed to the cloud site 130.

More specifically, the production site 120 (which may be an on-premise system, a cloud-based system, or the like) typically includes production systems 102 (servers, applications, virtual machines, and other hardware/software for forming a network, or the like) and is associated with and/or implemented in production storage 104. The data protection engine 106 protects the data stored in the production storage 104 and the production systems 102. More generally, the data protection engine 106 (which may be a physical and/or a virtual appliance, server, or system) protects the production site 120.

The data protection engine 106 may be associated with storage 108 that may be used while performing data protection operations. For example, local backups may be stored on the storage 108. The protection storage 108 may be used in the process of transmitting data to the cloud site 130.

In this example, data is transferred to the cloud site 130. The data protection engine 110 is configured to store and/or manage the protected data in secondary storage 112.

For example, the data protection engine 106 may backup virtual machines or other data from the production storage 104 to the secondary storage 112. In the event of a problem or failure, virtual machines can be restored from the secondary storage 112. Alternatively, the secondary storage 112 can be configured to go live, for example in disaster recovery situations and become part of a production site.

Figure 2:
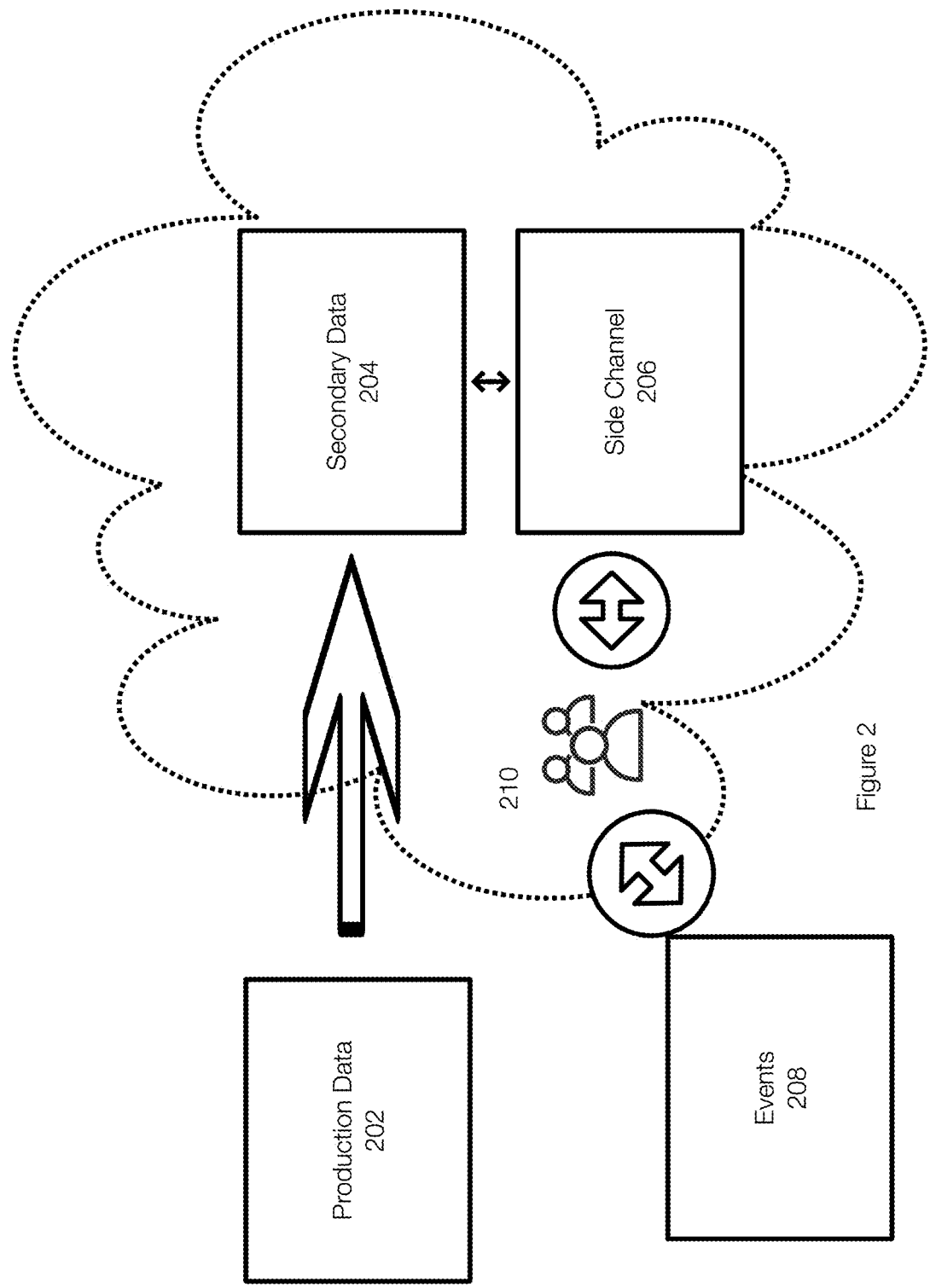
FIG. 2 illustrates an example of side channels associated with a data rate of transmitted data.

FIG. 2 illustrates an example of transferring data to the cloud and illustrates side channels associated with the transferred data. FIG. 2 illustrates that production data 202 is transferred to the cloud and stored as secondary data 204. The form of the data can vary and may be stored as virtual machines, block data, file data, de-duplicated data, snapshots, incremental backups, or the like or combination thereof.

When transferring the production data 202 to the secondary data 204, the transferred data is typically associated with a data transfer rate. The data transfer rate is an example of a side channel 206. The data transfer rate 206 may be generated at the cloud by the cloud provider or as part of the infrastructure or in other ways. In another example, the data transfer rate is determined on-premise. This ensures that even if the data rate is determined, the data rate is masked to others that may obtain the data rate from the side channel. More specifically, masking the data rate does not necessarily prevent the data rate from being discovered. Rather, masking the data rate prevents, by way of example only, third parties from correlating the data rate with other events.

The events 208 represent events associated with the owner of the production data 202. For example, a business or other entity may transfer a copy of the production data. The events 208 represent events associated with the business or entity such as new releases, product releases, or the like. The events 208 may depend on the nature of the entity.

As previously stated, various users 210 may have access to the side channels 206 as well as events 208. Thus, the users 210 may be able to derive or make assumptions about an entity based on at least one of the side channels and/or the events 208. In some instances, the users 210 may be able to deduce future events or actions based on the side channels 206 and past events 208. When an increase in the data rate, for example, corresponds to a product release, a news alert, or the like, the next increase in the data rate may relate to a similar forthcoming event.

Embodiments of the invention protect the side channel 206 such that the ability of the users 210 to deduce or derive information about an entity or its data is impeded or prevented. This is achieved, by way of example, by masking or obscuring the data rate.

Figure 3:
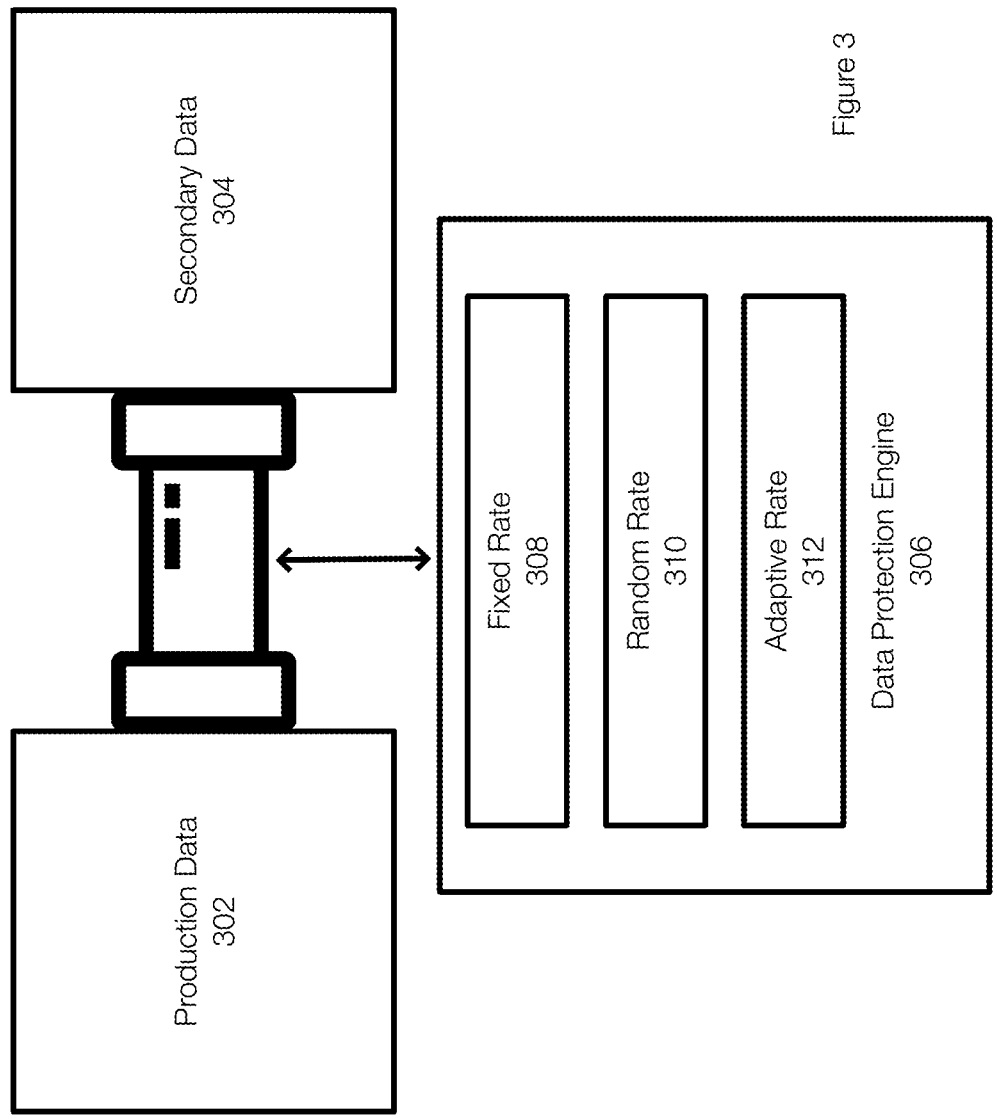
FIG. 3 illustrates an example of a data protection engine configured to mask a data rate of transmitted data.

FIG. 3 illustrates an example of data protection engine that is configured to protect the data transfer rate or other side channel. As illustrated in FIG. 3, the production data 302 (or a copy thereof) is transferred to the cloud and stored as secondary data 304 in accordance with a data rate that is selected or determined to mask an actual data rate. The data protection engine 306 protects the side channel using one or more techniques. To mask the data rate, the data may be transferred at a fixed rate 308, at a random rate 310, and/or using an adaptive rate 312. Transferring the production data 302 in at least one of these manners can help prevent users from using the side channel from expose, derive or otherwise use information about the data itself or about an associated person or entity. The data protection engine 306 can use one or more of these techniques and is not limited to a specific technique. In fact, the data protection engine 306 may use multiple techniques in any given time period in any order.

Embodiments of the invention thus relate to systems and methods for masking or obscuring the data rate (e.g., the data upload/download rate).

The fixed rate 308 technique can be performed by sending data to the secondary storage at a fixed rate or bandwidth. This technique may also accommodate transfer times. For example, the data may be transferred at the same time on the same days or at the same hours on the same days. For data that is more or less constantly uploaded, the rate is kept constant. By maintaining a constant data upload rate to the cloud, the side channel can be eliminated altogether. In other words, even if the side channel is available or accessible by a third party, the side channel for data rate contains no meaning because the data rate is constant.

In a situation where there is not enough data to maintain the constant or fixed rate, dummy data or padding may be added or transmitted. In this example, the data protection engine may implement a protocol that allows the dummy data to be identified and ignored. In a situation where there is too much data, the data may be queued and transmitted or uploaded at a later time when bandwidth becomes available.

The fixed rate 308 approach fully masks the data upload rate and gives zero knowledge to external users. The fixed rate 308 technique may need to be adapted over time or tuned. For example, the initial data rate, which may be based on the amount of data that is expected to be transferred, may become inaccurate over time. In addition, if the fixed rate is too high, the cost is also high and unnecessary at least because dummy data is needlessly being transmitted. If the data rate is set too low, then data is not being sent to the cloud fast enough and this may increase the RPO (Recovery Point Objective) and the data protection efficiency. The RPO is a measurement of how much data can be lost. If the data rate is too low, then the data is not transferred with sufficient speed and the RPO increases. In one example, the data rate can be set or adapted based on the expected or anticipated RPO.

Although the fixed rate can be tuned periodically to better fit the upload rate needs, other approaches can be used. The random rate 310 technique to masking the data rate involves setting a random rate for a specific time frame. The time frame can be set for any given time period. By way of example only, the time frame can be in terms of seconds, minutes, hours, days, or the like.

In one example, the data rate may be set at a fixed rate (e.g., 100 MBps) for the next minute. Using randomization techniques, a new rate can be set for the following minute (e.g., 150 MBps). In one example, the random values are typically configured to fall within a predefined range of data transfer rates. Further, the time period can also be randomized. Thus, both the rate and the length of the time frame for that rate can be randomized.

When masking the data rate with a random rate 310, third parties may not even realize that the data rate is being masked. In other words, the masking itself is concealed. In one example, the interval or time frame can be set in terms seconds and may appear as normal system behavior.

Like the fixed rate 308, the random rate 310 may need to be associated with ranges that may be manually defined. However, the data protection engine can also be configured to recognize or automatically define the ranges for the data rate based on how much data is being queued on the low end of the data rate and based on how much dummy data is required on the high end of the data rate. In addition to a random rate, machine learning can thus be incorporated into the data rate.

The data rate can also be masked or obscured using an adaptive rate 312. In this example, the pattern of the raw data metric (e.g., the data rate) is learned. This allows the data protection engine to automatically select or recommend a more optimal data rate that provides a balance between privacy needs, cost, and/or RPO demands.

The adaptive rate 312 is an example of a data-driven approach to obfuscate the data rate without comprising the privacy allowed by an entity. The data rate can be continually updated by accounting for recent bandwidth requirements and/or forecasted bandwidth demand.

When transmitting data using an adaptive rate architecture, an entity or organization may define a threshold frequency. This frequency may be exposed in the side channel. Frequencies above the threshold, however, are masked or obfuscated. Only information below this frequency could potentially give an external observer information on the side channel.

For example, if the frequency is set to 1 week, the upload rate will be fixed during at least 1 week. The side channel will not give any information in a resolution better than a single week. In other words, daily information cannot be discerned in this example.

In one example, the adaptive rate 312 effectively applies a low-pass filter on the side channel. Information under twice that frequency is lost and cannot be reconstructed. If the threshold frequency is not modified, then the adaptive rate 312 effectively becomes the fixed rate and no information is leaked by the side channel. On the other hand, constantly changing the threshold reveals more of the pattern. As a result, the amount of information leaked or exposed by the side channel correlates to the frequency, which may be set by a user. This allows the user to a make a conscious cost/performance choice that matches the needs of the organization.

Figure 4:
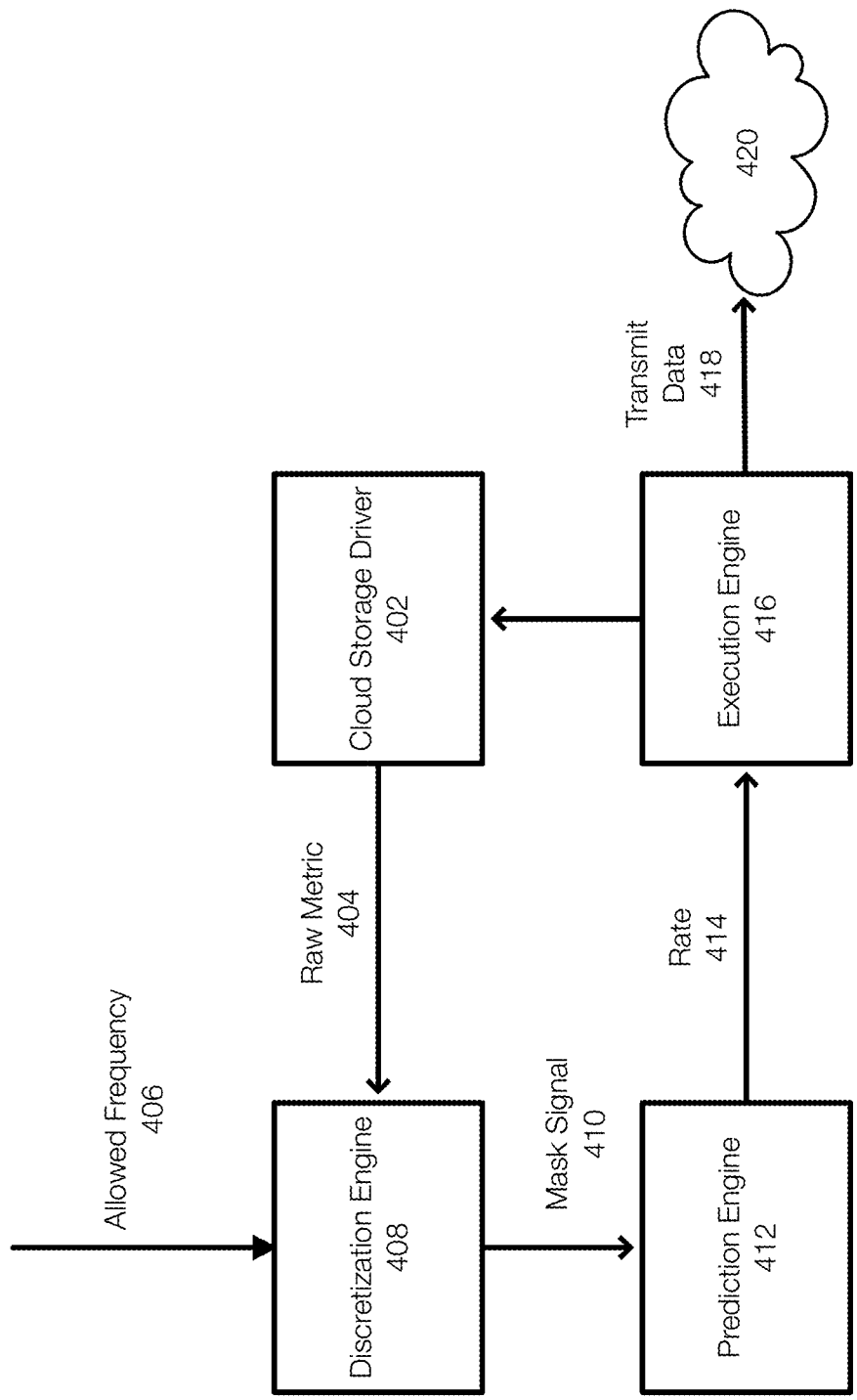
FIG. 4 illustrates an example of a method for masking a data rate.

FIG. 4 illustrates an example of an adaptive rate masking operation. In one example, all components are deployed and operate on premise. These components cooperate to determine a data rate and then the data is transmitted in accordance with the determined rate. In FIG. 4, a cloud storage driver 402 (which may be part of a data protection engine or system) sends raw metric data 404 to a discretization engine 408.

The raw metric data 404 may include a reading rate, a writing rate, or the like. For example, the raw metric data 404 may identify how much backup data is being generated based on a reading rate and/or writing rate of the data protection system. The raw metric data 404 may also identify other factors such as an anticipated amount of data to send, data queue levels (amount of data in queues), amount of dummy data added, or the like or combination thereof.

In one example, the raw metric data 404 may be a metric derived from an original rate as the data is ready to be sent by the cloud storage driver. This data is available. If for example, the cloud service provider is directly sending the data to the cloud service provider as the data became available then the amount of the uploaded data (writing metric) in a given time (a minute/second/millisecond) is considered the writing rate metric.

In the opposite use case, where the data is to be read from the cloud constantly, the reading metric should also be obfuscated or masked.

Now, wave frequency may indicate how many waves pass in a given amount of time. For example, 2 Hz indicates that 2 waves pass in a one second and 0.5 Hz indicates that 1 wave passing in 2 seconds. In real life metrics such as the writing rate metric, there is no one clear frequency and the rate metric may combine from a lot of different components of frequencies. In one example, the frequency components which are above the target frequency that the organization is allowed to expose are considered.

This is related to Shannon theory D=2B log 2K bits/s (simplified version) where B is the bandwidth in Hz and K is the number of symbols of the language and D is the maximum information that can be extracted. This suggests that no matter what algorithm the attacker would use, controlling the bandwidth (the maximum frequency—minimum frequency) will limit his ability to extract information. Information is transmitted by varying the values of the carrier signal. A higher frequency implies more variations per second. More variations per second imply more information per second. Hence, as the carrier signal frequency increases, this may have a more achievable data rate. At the same time, potentially more information/patterns can be learned.

The role of the discretization process or engine 408 is to adapt (or to enforce, make sure) the maximum raw frequency (from all components of frequencies) of the writing metric from the cloud service driver to be at most the target frequency.

For example, if the maximum frequency is 10 Hz and the organization is allowing 1 Hz, this can be achieved using the PAA algorithm by averaging (for alternative can be maximum or minimum) each second to one a value (instead of 10 values).

An additional example, if the maximum frequency is 0.5 Hz and the organization is allowing 1 Hz then applying PAA will not change the original raw metric in a significant way.

The discretization engine 408 thus receives an allowed frequency (f) 406. The discretization engine 408 may be updated at different times with a new allowed frequency. The allowed frequency 406 can be user defined or machine learned in some examples.

The discretization engine 408 outputs a mask signal 410 which should be aligned to a new frequency f'<f. The new signal is sent to a prediction engine 412 that may use a model (e.g., holt-winter online algorithm) to process the mask signal 410 and predict a new rate 414. The new rate 414 is sent to an execution engine 416.

The execution engine 416 receives the new rate 414 and required data from the cloud storage driver 402 processing the data. The execution engine 416 executes the operation with the given rate and transmits the data 418 to the cloud 420 according to the rate. In one example, the execution engine 416 may pull the data stream being transmitted at the masked rate and transmit the data. Alternatively, the execution engine may read data from the cloud or another source.

By way of example only, the discretization engine 408 may perform Piecewise Aggregate Aggregation (PAA) algorithm. Embodiments of the invention are not limited to the PAA algorithm. The algorithm works as follows: given a time series with n points and a number N<n, the time series will be dimensional reduced to N points by dividing the n points to N equal groups of points by order and aggregating and averaging each group.

Figure 5:
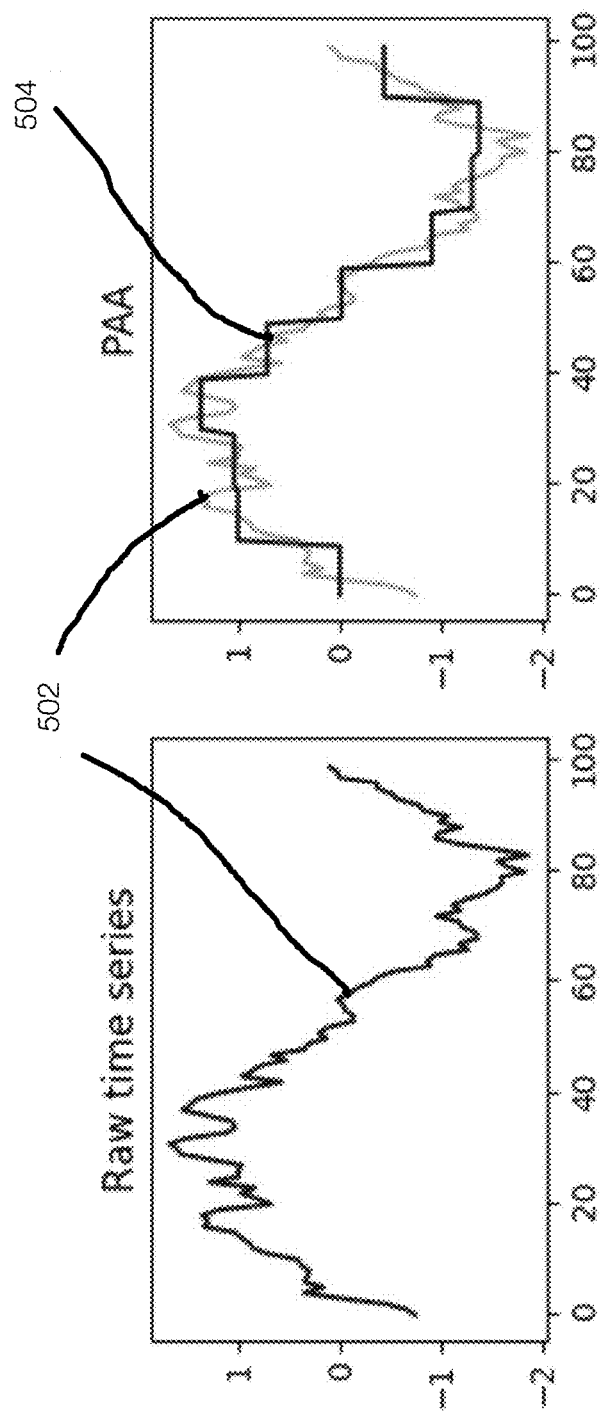
FIG. 5 illustrates an example of a graph that illustrates a masked data rate.

FIG. 5 illustrates the process. In FIG. 5, the time series 504 is dimensional reduced to a signal 502. In this example of FIG. 5, the statistical operator is an average. However, other statistical operators (e.g., a maximum value) could be used.

In one example, the parameter N is derived from the allowed frequency 406 shown in FIG. 4 in some examples.

As stated before, in any cases where the amount of data to be sent exceeds the amount of bandwidth available, the data may be accumulated (queued) and sent later. Embodiments of the invention ensure that the average of the function selected is greater or equal than the average of the signal, in order to allow all data to be transmitted.

The adaptive rate may perform rate learning or may perform a predicting or forecasting process. These may be performed online and/or offline. For example, an online process may work as follows: Given $x_{t-1}$, $x_{t-2}$, . . . , $x_{t-l}$ series of lag l, the process would predict the next instance $x_t$ at time t. The model constantly adapts its internal model from the previous instances. One reason to learn the rate is to ensure that the data protection operations are cost efficient.

As previously stated, the operation (e.g., the data transfer) is executed at the predicted rate. The execution engine 416 may be responsible for ensuring that the data fits the needed rate. In one example, tools are provided to help achieve the desired rate. For example, padding data may be added to the transmitted data. If there is no data to send, dummy data may be sent. If the data to send cannot be accommodated, the data may be queues or buffered. In another example, the rate may be achieved using compression. For example, the data rate can be achieved by controlling the compression ratio of the data. The data may be de-duplicated prior to transmission. These tools can be used in any combination.

For example, if the current data rate allows sending exactly 1 MB of data and there is 1.5 MB of data to send, the data protection engine can compress the data, and depending on the compression ratio, pad the result to fit exactly 1 MB. If compression is not sufficient to reduce the data, the data protection engine will buffer some of the data locally to send later.

Embodiments of the invention thus protect from side channel discovery attacks, provide higher utility while aligning with the security policy of the organization, and are decoupled from the storage system. In one example, the allowed frequency expresses a compromise about how much information may be leaked in the side channel. As previously stated, if the allowed frequency is one week at a given rate, no information at a granularity greater than a week (e.g., a daily rate) can be leaked. There may be some information leaked for larger granularity (e.g., biweekly or monthly). The amount of information leaked by the side channel thus correlates, in one example, to the frequency set by the user or the entity as the allowed frequency 406.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations.

At least some embodiments of the invention provide for the implementation of the disclosed functionality in existing backup platforms, examples of which include the Dell-EMC NetWorker and Avamar platforms and associated backup software, and environments such as the Dell-EMC DataDomain environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for protecting a side channel associated with data, the method comprising determining a rate for transferring data between a production site and a secondary site and transferring the data at the determined rate.

Embodiment 2. The method of embodiment 1, wherein the transferred data is padded with extra data when there is insufficient data to achieve the determined rate and wherein the transferred data is queued when the data cannot be transmitted at the determined rate.

Embodiment 3. The method of embodiment 1 and/or 2, wherein the determined rate is a fixed rate, the method further comprising tuning the determined rate based on a recovery point objective.

Embodiment 4. The method of embodiment 1, 2 and/or 3, wherein the determined rate is a random rate, the method further comprising setting the determined rate for a specific time period and changing the rate for a next specific time period.

Embodiment 5. The method of embodiment 1, 2, 3, and/or 4, wherein the random rate is different for each specific time period.

Embodiment 6. The method of embodiment 1, 2, 3, 4, and/or 5, wherein the random rate is configured to appear as normal system behavior.

Embodiment 7. The method of embodiment 1, 2, 3, 4, 5, and/or 6, wherein the determined rate is an adaptive rate, the method further comprising repeatedly: sending raw metric data from a cloud storage driver to a discretization engine, performing a discretization process by the discretization engine based on the raw metric data and an allowed frequency, predicting a new rate, and transmitting the data at the new rate.

Embodiment 8. The method of embodiment 1, 2, 3, 4, 5, 6, and/or 7, wherein the discretization process dimensionally reduces a time series of n points to N points where N<n.

Embodiment 9. The method of embodiment 1, 2, 3, 4, 5, 6, 7, and/or 8, further comprising, to achieve the new rate, performing one or more of: adding padding data to the transmitted data, generating dummy data even if no data is available to transmit, buffer excess data for later transmission, compressing the data and controlling a compression ratio, and/or deduplicating the data to be transmitted.

Embodiment 10. The method of embodiment 1, 2, 3, 4, 5, 6, 7, 8, and/or 9, further comprising changing the allowed frequency.

Embodiment 11. The method of embodiment 1, 2, 3, 4, 5, 6, 7, 8, 9, and/or 10, wherein the new rate is aligned with a frequency that is less than the allowed frequency.

Embodiment 12. A non-transitory storage medium having stored therein instructions that are executable by one or more hardware processors to perform operations comprising: determining a rate for transferring data between a production site and a secondary site, and transferring the data at the determined rate.

Embodiment 13. The non-transitory storage medium of embodiment 12, wherein the transferred data is padded with extra data when there is insufficient data to achieve the determined rate and wherein the transferred data is queued when the data cannot be transmitted at the determined rate.

Embodiment 14. The non-transitory storage medium of embodiment 12 and/or 13, wherein the determined rate is a fixed rate, the operations further comprising tuning the determined rate based on a recovery point objective.

Embodiment 15. The non-transitory storage medium of embodiment 12, 13, and/or 14, wherein the determined rate is a random rate, the operations further comprising setting the determined rate for a specific time period and changing the rate for a next specific time period.

Embodiment 16. The non-transitory storage medium of embodiment 12, 13, 14 and/or 15, wherein the random rate is different for each specific time period.

Embodiment 17. The non-transitory storage medium of embodiment 12, 13, 14, 15 and/or 16, wherein the random rate is configured to appear as normal system behavior.

Embodiment 18. The non-transitory storage medium of embodiment 12, 13, 14, 15, 16 and/or 17, wherein the determined rate is an adaptive rate, the operations further comprising repeatedly: sending raw metric data from a cloud storage driver to a discretization engine, performing a discretization process by the discretization engine based on the raw metric data and an allowed frequency, predicting a new rate, and transmitting the data at the new rate.

Embodiment 19. The non-transitory storage medium of embodiment 12, 13, 14, 15, 16, 17 and/or 18, wherein the discretization process dimensionally reduces a time series of n points to N points where N<n.

Embodiment 20. The non-transitory storage medium of embodiment 12, 13, 14, 15, 16, 17, 18 and/or 19, further comprising, to achieve the new rate, performing one or more of: adding padding data to the transmitted data, generating dummy data even if no data is available to transmit, buffer excess data for later transmission, compressing the data and controlling a compression ratio, and/or deduplicating the data to be transmitted.

Embodiment 21. The non-transitory storage medium of embodiment 12, 13, 14, 15, 16, 17, 18, 19 and/or 20, further comprising changing the allowed frequency.

Embodiment 22. The non-transitory storage medium of embodiment 12, 13, 14, 15, 16, 17, 18, 19, 20 and/or 21, wherein the new rate is aligned with a frequency that is less than the allowed frequency.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

The physical computing device may include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting a side channel associated with data, the method comprising:
    sending raw metric data from a cloud storage driver to a discretization engine;
    performing a discretization process by the discretization engine based on the raw metric data and an allowed frequency;
    predicting a data transmission rate;
    transferring data from a first site to a second site; and
    for a given time period during which the data is transmitted, masking the data transmission rate, wherein the transferred data is padded with extra data when there is insufficient data to achieve the data transmission rate and wherein the transferred data is queued when the data cannot be transmitted at the data transmission rate.

2. The method of claim 1, further comprising transferring the data at a determined rate.

3. The method of claim 2, wherein the determined rate is a random rate, further comprising setting the determine rate for a specific time period and setting a different determined rate for a next time period.

4. The method of claim 1, further comprising repeatedly sending the raw metric data, performing the discretization process, and predicting the data transmission rate, wherein the data transmission rate is an adaptive rate.

5. The method of claim 1, further comprising changing the allowed frequency.

6. The method of claim 1, wherein the raw metric data includes one or more of a writing rate, a reading rate, anticipated amount of data to be transferred, data queue levels, amount of dummy data added, or combination thereof.

7. The method of claim 1, further comprising reading the data from a target site and masking a rate at which the data is read using a fixed rate, a random rate, or an adaptive rate.

8. The method of claim 1, further comprising masking the data transmission rate, wherein the data transmission rate is selected while accounting for recent bandwidth requirements and/or forecasted bandwidth requirements.

9. The method of claim 1, further comprising selecting a different data transmission rate based at least partially on privacy needs, cost, and/or recovery point objective requirements.

10. The method of claim 1, further comprising randomizing the time periods and the data transmission rate.

11. A non-transitory storage medium having stored therein instructions that are executable by one or more hardware processors to perform operations comprising:
    sending raw metric data from a cloud storage driver to a discretization engine;
    performing a discretization process by the discretization engine based on the raw metric data and an allowed frequency;
    predicting a data transmission rate;
    transferring data from a first site to a second site; and
    for a given time period during which the data is transmitted, masking the data transmission rate, wherein the transferred data is padded with extra data when there is insufficient data to achieve the data transmission rate and wherein the transferred data is queued when the data cannot be transmitted at the data transmission rate.

12. The non-transitory storage medium of claim 11, further comprising transferring the data at a determined rate.

13. The non-transitory storage medium of claim 12, wherein the determined rate is a random rate, further comprising setting the determine rate for a specific time period and setting a different determined rate for a next time period.

14. The non-transitory storage medium of claim 11, further comprising repeatedly sending the raw metric data, performing the discretization process, and predicting the data transmission rate, wherein the data transmission rate is an adaptive rate.

15. The non-transitory storage medium of claim 11, further comprising changing the allowed frequency.

16. The non-transitory storage medium of claim 11, wherein the raw metric data includes one or more of a writing rate, a reading rate, anticipated amount of data to be transferred, data queue levels, amount of dummy data added, or combination thereof.

17. The non-transitory storage medium of claim 11, further comprising reading the data from a target site and masking a rate at which the data is read using a fixed rate, a random rate, or an adaptive rate.

18. The non-transitory storage medium of claim 11, further comprising masking the data transmission rate, wherein the data transmission rate is selected while accounting for recent bandwidth requirements and/or forecasted bandwidth requirements.

19. The non-transitory storage medium of claim 11, further comprising selecting a different data transmission rate based at least partially on privacy needs, cost, and/or recovery point objective requirements.

20. The non-transitory storage medium of claim 11, further comprising randomizing the time periods and the data transmission rate.

\* \* \* \* \*